United States Patent Office 2,696,497
Patented Dec. 7, 1954

2,696,497

METHOD OF REMOVING ALKYNES FROM GASES

Martin R. Cines and Robert J. Hogan, Bartlesville, Okla., assignors to Phillips Petroleum Company, a corporation of Delaware No Drawing. Application September 9, 1952,
Serial No. 308,722

11 Claims. (Cl. 260—500)

This invention relates to a method for reacting an alkyne with sulfur dioxide in the gaseous phase. In one aspect it relates to a process for removing an alkyne such as acetylene from a gas, especially from a gas containing an alkene, such as ethylene. In another aspect it relates to a method for producing an organic sulfur-containing acid.

The production of ethylene by the cracking of paraffinic hydrocarbons, such as ethane, propane and butane, is known in the art. In such a cracking process, large amounts of gaseous paraffinic or olefinic hydrocarbons, particularly ethylene, are obtained together with small amounts of acetylene. The amount of acetylene produced depends on several factors, such as temperature and reaction time and the nature of the feed stock. The amount of acetylene in gases produced by such a process is usually less than 10 per cent and is ordinarily in the range 0.1 to 4 or 5 per cent.

In many cases the presence of acetylene in an ethylene-containing gas is undesirable, particularly when the gas is to be used for catalytic alkylation in the presence of aluminum halides since the acetylene has a deleterious effect upon the catalyst. It is, therefore, evident that the removal of acetylene is often desirable.

The removal of acetylene by fractional distillation or adsorption is difficult because of the close boiling points or volatilities of ethylene and acetylene.

It is known in the prior art to produce organic sulfur-containing acids, such as ethane sulfinic acid and related compounds, which are useful in the production of elastomer additives and as reducing agents.

According to this invention, a normally gaseous alkyne containing a terminal triple bond is reacted with sulfur dioxide in the gaseous phase in the presence of a contact mass comprising silver nitrate supported on a porous inert solid to produce sulfur-containing organic acids, which have utility as indicated above.

The method of this invention is particularly applicable to gas streams containing from 0.1 to 10 volume per cent of the alkyne and especially to gas streams containing from 0.1 to 5 volume per cent of the alkyne. The invention is especially useful for the purpose of removing acetylene from ethylene-containing gas.

Further, in accordance with the invention sulfur dioxide is added to the alkyne-containing stream in a sulfur dioxide to alkyne mol ratio in the range 0.6:1 to 2.3:1, preferably 0.8:1 to 1.8:1.

The contact mass utilized in accordance with the invention is silver nitrate supported upon a porous solid, such as granular silica gel, porous alumina or porous carbon. The mass may be produced by any suitable method known in the art. A very satisfactory method is to impregnate the porous support with an aqueous solution of silver nitrate and subsequently dry the impregnated mass. The silver content of the catalyst is preferably at least 7 per cent and more preferably from 7 to 30 weight per cent. A further preferred range of silver content is 8 to 30 weight per cent and more preferably 8 to 15 weight per cent. A silver content higher than 30 weight per cent can be used if desired, although a silver content above 30 weight per cent is ordinarily disfavored for economic reasons. It has been shown experimentally that a silver content below 7 per cent is not desirable, since such a mass does not promote the acetylene-sulfur dioxide reaction satisfactorily.

The contact mass may be used in the form of a fixed or mobile bed, according to prior art methods of fluid-solid contacting.

The temperature of the contacting is in the range 0 to 200° F., preferably 32 to 200° F., and more preferably 70 to 140° F. The reaction is conducted in the gaseous phase, since the alkyne-sulfur dioxide reaction is nonselective in the liquid phase; i. e., the alkenes which are present also react with sulfur dioxide under liquid-phase conditions but do not react to an appreciable extent in the gaseous phase. The reaction pressure is in the range 0.1 to 4 atmospheres, preferably 0.5 to 1.5 atmospheres. The space velocity is in the range 200 to 1500 volumes of total gas per volume of contact mass per hour.

As stated, the starting materials of this invention are sulfur dioxide and a normally gaseous alkyne having a terminal triple bond. Thus the alkynes used in the process of the invention are acetylene, methyl acetylene or propyne and ethyl acetylene or 1-butyne.

The process of the invention is conducted by adding sulfur dioxide to the alkyne-containing gas, contacting the resultant gas with the contact mass and recovering an alkyne-free gas. The sulfur-containing acid can be recovered by extracting the contact mass with a solvent such as acetone, and recovering the sulfur-containing acid from the acetone extract by known methods such as evaporation or fractional distillation. Acid remaining in the effluent gas can be recovered by condensation and/or scrubbing with a liquid such as water or acetone.

*Example I*

Acetylene was reacted with sulfur dioxide in the presence of a contact mass consisting of silver nitrate supported on granular silica gel. The silver content of the mass was 9.8 weight per cent.

The data obtained are shown in the following tabulation:

| Temp., °F. | $C_2H_2$ Content of feed, Vol. Percent | Pressure, mm. Hg | Space Velocity Gas, cc/min/gm. contact mass | $SO_2/C_2H_2$, Vol. Ratio | $C_2H_2$ Conversion, Vol. Percent |
|---|---|---|---|---|---|
| 32 | 2.9 | 820 | 10.6 | 1.6/1 | 96 |
| 79 | 1.8 | 820 | 24.8 | 1.0/1 | 79 |
| 32 | 2.9 | 820 | 10.6 | 0.0/1 | 0 |

The data in the foregoing table show that satisfactory acetylene removal is obtained at slightly super-atmospheric pressure and a temperature as low as 32° F. for an $SO_2:C_2H_2$ volume ratio in the range 1.0:1 to 1.6:1. The data also show that in the absence of sulfur dioxide, substantially no acetylene removal occurred.

*Example II*

A mixture of ethylene, sulfur dioxide and nitrogen was contacted with a silver nitrate-silica gel mass similar to that used in Example I.

The data obtained are shown in the following tabulation:

| Temp., °F. | $C_2H_4$ Content of feed, Vol. Percent | $SO_2:C_2H_4$ Vol. Ratio | $C_2H_4$ Charged, cc. | $C_2H_4$ Recovered, cc. | $C_2H_4$ Lost, Vol. Percent |
|---|---|---|---|---|---|
| 78 | 48.9 | 0. | 108 | 101 | 6.5 |
| 78–160 | 37.2 | 0.4 | 80.5 | 72.2 | 10.3 |
| 30–150 | 37.6 | 0.6 | 82.5 | 81.8 | 0.8 |
| 82 | 49.1 | 0.3 | 104.1 | 109.8 | 0 |

The data in the foregoing tabulation show that only small amounts of ethylene are removed or converted by the method of this invention. It will be noted that the $SO_2-C_2H_4$ ratios are lower than those in Example I. It is to be remembered, however, that when a cracked gas containing higher amounts of ethylene than of acetylene is treated according to this invention, the $SO_2-C_2H_4$ ratio will actually be lower than the $SO_2-C_2H_2$ ratio and that the $SO_2-C_2H_4$ ratio will be of the general order of magnitude shown in the foregoing tabulation. Therefore, as regards the reactivity of ethylene with the contact mass, the foregoing tabulation represents a run under practical conditions.

Example III

A mixture of acetylene, sulfur dioxide, and nitrogen was contacted with a contact mass of the composition shown in Example I at a temperature in the range of 82–108° F. The following data were obtained:

| Space Velocity (cc./min./cc. contact mass) | $C_2H_2$ content of feed (vol. percent) | $SO_2/C_2H_2$ (vol. ratio) | Total $C_2H_2$ removed at 100% conversion (cc./10 grams contact mass) |
|---|---|---|---|
| 1,440 | 1.5 | 0.6 | 41 |
| 1,560 | 2.4 | 0.6 | 43 |
| 1,440 | 1.3 | 1.4 | 117 |
| 1,500 | 1.7 | 1.5 | 114 |
| 1,680 | 1.7 | 2.0 | 50 |
| 1,620 | 1.6 | 2.4 | 52 |

The foregoing data show that acetylene removal reaches a maximum at a $SO_2$–$C_2H_2$ mol ratio in the range 0.6:1 to 2.0:1.

Example IV

After a run similar to those described in Examples I and III the contact mass was extracted with acetone and the extract was evaporated to obtain a dark red viscous liquid. Properties of this liquid are shown in the following tabulation:

Equivalent wt. by titration with standard base ---- 105
Carbon content, wt. per cent ---------------- 25.2
Hydrogen content, wt. per cent -------------- 6.0
Sulfur content, wt. per cent ---------------- 10.6
Oxygen content, wt. per cent (by difference) ---- 58.2

In addition, the product acid had a density of 1.27 grams per cc. at 75° F., a pH of 1, and a bromine number of 0.3. The acid was soluble in acetone and in ethanol. It was slightly soluble in water, insoluble in benzene and insoluble in ether.

Variation and modification are possible within the specification and claims to this invention, the essence of which is that a method is provided for reacting a normally gaseous alkyne containing a terminal triple bond with sulfur dioxide in the gaseous phase in the presence of a contact mass comprising silver nitrate supported upon a porous inert solid and that the method can be utilibed for removing such an alkyne from a gas stream containing the same and for the production of sulfur-containing organic acids.

We claim:

1. A process, for removing an alkyne from a gas containing same which comprises adding sulfur dioxide to said gas, which contains from 0.1 to 10 volume per cent of an alkyne containing from 2 to 4 carbon atoms per molecule and having a terminal triple bond, the ratio of added sulfur dioxide to said alkyne being in the range 0.6:1 to 2.3:1, contacting the resulting mixture at a temperatuer in the range 0 to 200° F., a pressure in the range 0.1 to 4 atmospheres, and a space velocity in the range 200 to 1500 volumes of gas per volume of contact mass per hour, with a contact mass comprising silver nitrate supported on a porous inert solid, said contact mass having a silver content of at least 7 weight per cent, and recovering an alkyne-free gas.

2. The process of claim 1 in which said feed gas contains from 0.1 to 5 volume per cent of said alkyne, the mol ratio of sulfur dioxide to alkyne is in the range 0.8:1 to 1.2:1, said porous solid is granular silica gel, the silver content of said contact mass is in the range 8 to 15 weight per cent, said temperature is in the range 32 to 200° F., and said pressure is in the range 0.5 to 1.5 atmospheres.

3. The process of claim 2 in which said alkyne is acetylene.

4. The process of claim 2 in which said alkyne is propyne.

5. The process of claim 2 in which said alkyne is 1-butyne.

6. A process for removing acetylene from an ethylene-containing gas which process comprises adding to said ethylene-containing gas sulfur dioxide in a mol ratio with respect to acetylene of from 0.8:1 to 1.2:1, contacting the resulting gas at a temperature in the range 70 to 140° F., a pressure in the range 0.5 to 1.5 atmospheres, and a space velocity in the range 200 to 1500 volumes of gas per volume of contact mass per hour, with a contact mass comprising silver nitrate supported on granular silica gel, said contact mass containing from 8 to 15 weight per cent silver, and recovering an ethylene-containing gas having a substantially reduced acetylene content.

7. A process, for removing acetylene from an ethylene-containing gas, which comprises reacting said acetylene with sulfur dioxide in the gaseous phase by contacting said gas with a contact mass comprising silver nitrate supported on silica gel, said contact mass containing from 8 to 15 weight per cent silver, at a temperature in the range 32° to 200° F., a pressure in the range 0.5 to 1.5 atmospheres and a space velocity in the range 200 to 1500 volumes of gas per volume of contact mass per hour, recovering a gas having a substantially decreased acetylene content, extracting said contact mass with acetone to obtain a solution of an organic sulfur-containing acid in acetone and recovering said acid by evaporation of the acetone solution.

8. The process of claim 1 in which said porous solid is porous alumina.

9. The process of claim 1 in which said porous solid is porous carbon.

10. A process for removing an alkyne having from 2 to 4 carbon atoms per molecule and a terminal triple bond from an alkene-containing gas which process comprises adding to said alkene-containing gas sulfur dioxide in a mole ratio with respect to said alkyne of from 0.6:1 to 2.3:1, contacting the resulting mixture at a temperature in the range 0 to 200° F., a pressure in the range 0.1 to 4 atmospheres, and a space velocity in the range 200 to 1500 volumes of said mixture per volume of contact mass per hour, with a contact mass comprising silver nitrate supported on a porous inert solid, said contact mass having a silver content in the range 7 to 30 weight per cent, and recovering an alkene-containing gas having a substantially reduced alkyne content.

11. A process for removing a normally gaseous alkyne having a terminal triple bond from a gas containing same which process comprises adding to said gas sulfur dioxide, contacting the resulting mixture in the gaseous phase with a solid contact mass containing at least 7 per cent of silver in the form of silver nitrate, supported on a porous inert solid, and recovering a gas having a substantially reduced alkyne content.

References Cited in the file of this patent

UNITED STATES PATENTS

| Number | Name | Date |
|---|---|---|
| 2,128,932 | Fitch et al. | Sept. 6, 1938 |
| 2,138,584 | Marvel | Nov. 29, 1938 |
| 2,280,818 | Frey et al. | Apr. 28, 1942 |
| 2,370,809 | Morrell et al. | Mar. 6, 1945 |
| 2,471,550 | Shaw | May 31, 1949 |